(12) United States Patent
Yeo

(10) Patent No.: US 6,622,502 B2
(45) Date of Patent: Sep. 23, 2003

(54) VEHICLE AIR-CONDITIONER CONTROL APPARATUS AND METHOD THEREFOR

(75) Inventor: Jung-Hack Yeo, Kyungki-Do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 10/162,861

(22) Filed: Jun. 4, 2002

(65) Prior Publication Data

US 2002/0194856 A1 Dec. 26, 2002

(30) Foreign Application Priority Data

Jun. 20, 2001 (KR) ........................................ 2001-35142

(51) Int. Cl.[7] .............................. F25D 17/00; F25B 1/00
(52) U.S. Cl. ......................................... 62/179; 62/229
(58) Field of Search ....................... 62/179, 229, 228.3, 62/180, 183, 178

(56) References Cited

U.S. PATENT DOCUMENTS 5,289,692 A * 3/1994 Campbell et al. ............. 62/181
6,145,330 A * 11/2000 Goto et al. .................... 62/180
6,304,803 B1 * 10/2001 Dao ............................. 701/36

* cited by examiner

Primary Examiner—Marc Norman
(74) Attorney, Agent, or Firm—Pennie & Edmonds LLP

(57) ABSTRACT

A vehicle air conditioner control apparatus having a telecommunication cable communicating between a remote control and a drive control to facilitate system operation and construction. The apparatus includes an input part for enabling a driver to control operations of the air conditioner; the remote control part for transforming a manipulated signal of the input part to a transmission signal and sending same through a communication cable; the drive control part for generating and outputting a signal to drive the air conditioner correspondingly to the transmission signal received from the remote control part; a drive part for operating according to the drive signal output from the drive control part and performing a function to cool off the vehicle; and a compressor pressure switch for showing the input status of the compressor.

2 Claims, 6 Drawing Sheets

VEHICLE AIR-CONDITIONER CONTROL APPARATUS AND METHOD THEREFOR

FIELD OF THE INVENTION

The present invention relates to an air-conditioner for a vehicle and a method therefor, and more particularly, to an air conditioner control apparatus including a telecommunication cabling system to simplify wiring and reduce the total weight of a vehicle.

BACKGROUND OF THE INVENTION

As vehicles have become more popular, people's mind-set has changed to recognize vehicles not as luxury products, but as a necessity of life. As people spend more time in cars, there has been a greater demand for a notion that cars should play a role as an important space of life.

Particularly, an air conditioner, which cools the inside of a vehicle in summer, is one of key required elements to be taken into account when a vehicle is purchased. Since the air conditioner is essential to improving comfort and convenience in using a vehicle, many technologies have been developed to improve the functions of the air conditioner. As is well known, an air conditioner relieves heat generated by an engine of a vehicle, by riders and external solar radiation so that the riders or passengers can feel more comfortable with less fatigue and maintain pleasantness in driving the vehicle.

In general, an air conditioner has a function of cooling a vehicle by utilizing a 4-step cooling cycle. The air conditioner performs cooling operations by controlling major parts such as condenser, compressor, evaporator, liquid tank and expansion valve.

When a driver manipulates remotely-controlled switches on a panel, the aforementioned parts of the air conditioner can be controlled or driven according to their relevant operational signals. The structure of the air conditioner controlling apparatus in general is illustrated in the schematic diagrams shown in FIGS. 1 through 3.

As shown in FIG. 1, a conventional air conditioner of a vehicle is constructed with a remotely-controlled switch 10, a drive module 30 and a hard wire 20 that transmits signals of the switch 10 to the drive module 30.

When a driver is to turn on the air conditioner, he or she manipulates the switch 10 on a panel, switching on the air conditioner and selecting manual operational steps 1, 2 or 3 or automatic operational phase. When an air conditioner switch 11 of the switch 10 is turned on, battery power (BATT+) is applied to an air conditioner relay 31 as shown in FIG. 2. When the air conditioner relay is turned on, the battery power (BATT+) is applied to an air conditioner drive unit 41, having an evaporator fan motor, a condenser fan motor, a compressor fan motor and the like.

At the same time, other switches are also driven by operation of the relevant relays. As shown in FIG. 3, the first, second and third operational step switches 12, 13, 14, an auto temperature control switch 15 and a temperature sensor 16 are directly connected to relevant relays and controllers (not shown) through wires 22, 23, 24, 25, 26 of the hard wire 20 to be turned on or off according to the selected status of switches. Relevant units of the drive unit 40 are driven according to the on/off status of the relays and controllers, so that the air conditioner performs its function.

However, there are disadvantages in the prior art in that the hard wire connects the switch 10 of the driver's manipulating panel through the drive unit 40, requiring as many individual wires of the hard wire and as many relays and controllers as the number of switches, complicating the wiring layout of the total hard wire 20 and increasing the manufacturing cost. There is at least another problem in the prior art in that a great number of wiring connections and relevant relays increase the total weight of the vehicle and its fuel consumption.

SUMMARY OF THE INVENTION

The present invention provides a vehicle air conditioner control apparatus including input means for a driver to manipulate and drive an air conditioner, remote control means for transforming a manipulated signal of the input means to a transmission signal and then sending the signal through a telecommunication cable, drive control means for generating and outputting a relevant signal to drive the air conditioner according to the transmission signal received from the remote control means through the telecommunication cable, and drive means for performing a function to cool off the vehicle according to the drive signal output from the drive control means.

In a further aspect of the present invention, there is provided a method for driving the vehicle air conditioner control apparatus. In a preferred embodiment, the method comprises driving an evaporator fan at a predetermined speed according to a degree of the internal temperature of the vehicle if an automatic temperature control signal is selected and remotely sent by a driver, driving a condenser fan and a compressor according to the status of a pressure switch of the compressor, driving an evaporator fan at a corresponding speed if a signal relating to one of manual operational levels 1, 2, 3 is selected and sent remotely, and driving the condenser fan and the compressor according to the status of internal temperature and compressor pressure switch if the remotely sent air conditioner driving signal is received after the evaporator fan is driven.

BRIEF DESCRIPTION OF THE DRAWINGS

For fuller understanding of the nature and object of the invention, reference should be made to the following detailed description taken in conjunction with the accompanying drawings in which.

DETAILED DESCRIPTION OF THE INVENTION

Hereinafter, preferred embodiments of the present invention will be described in detail with reference to accompanying drawings.

Figure 1:
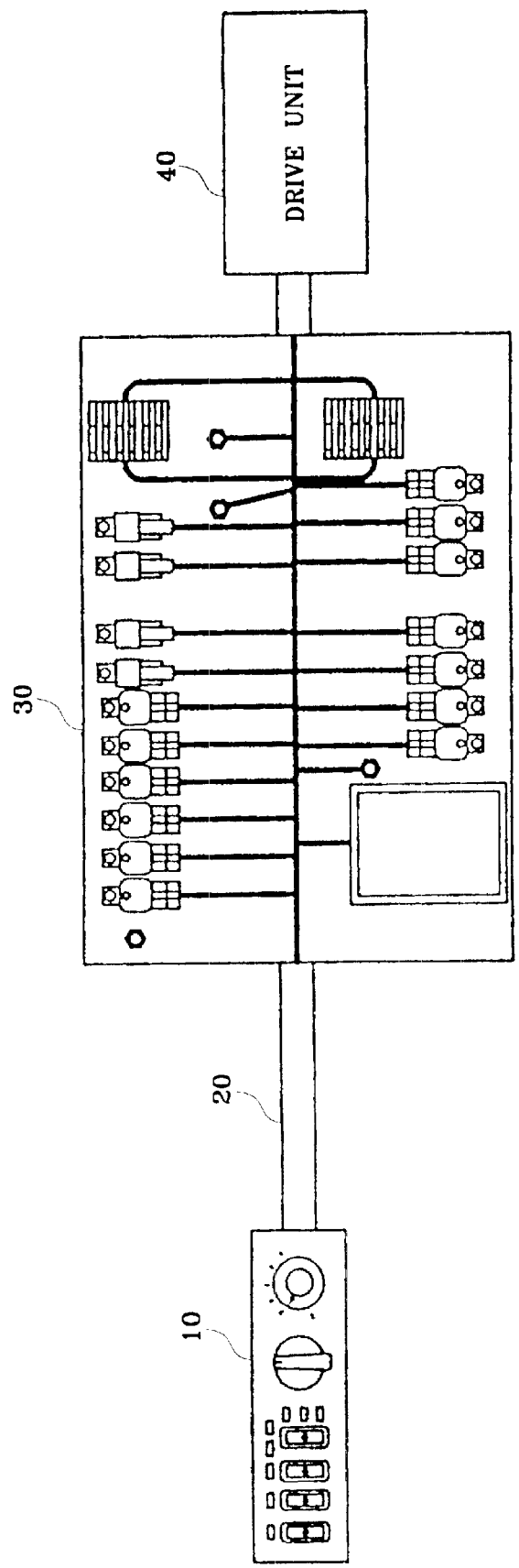
FIG. 1 is a block diagram of a conventional air conditioner control apparatus in accordance with the prior art.
Figure 2:
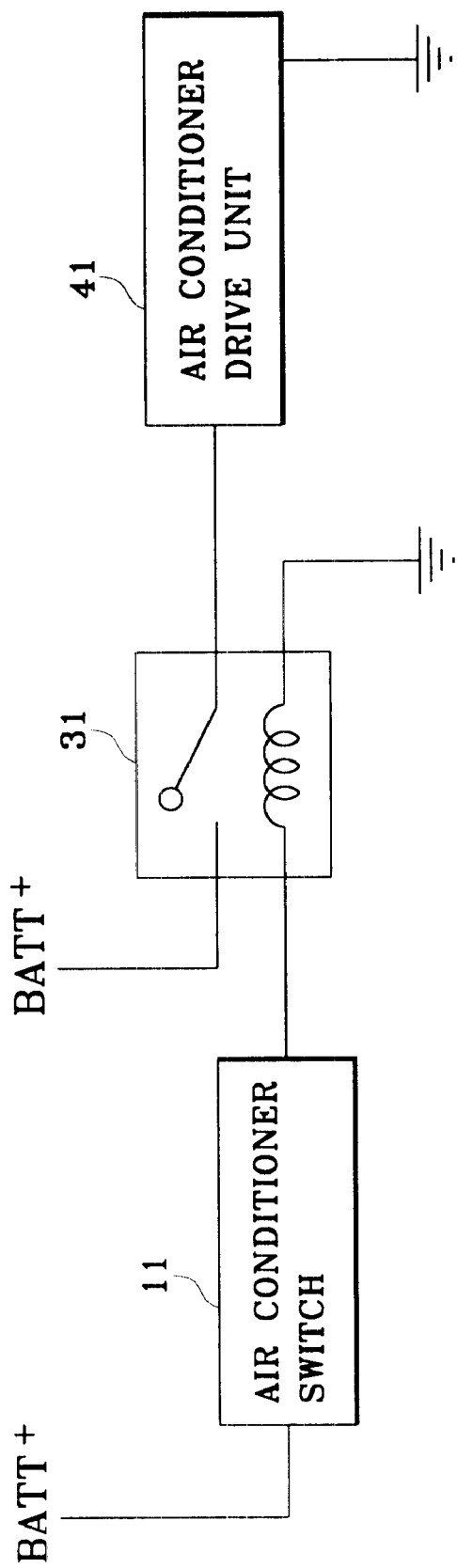
FIG. 2 is a block diagram illustrating operation of the air conditioner controlling switches shown in FIG. 1.
Figure 3:
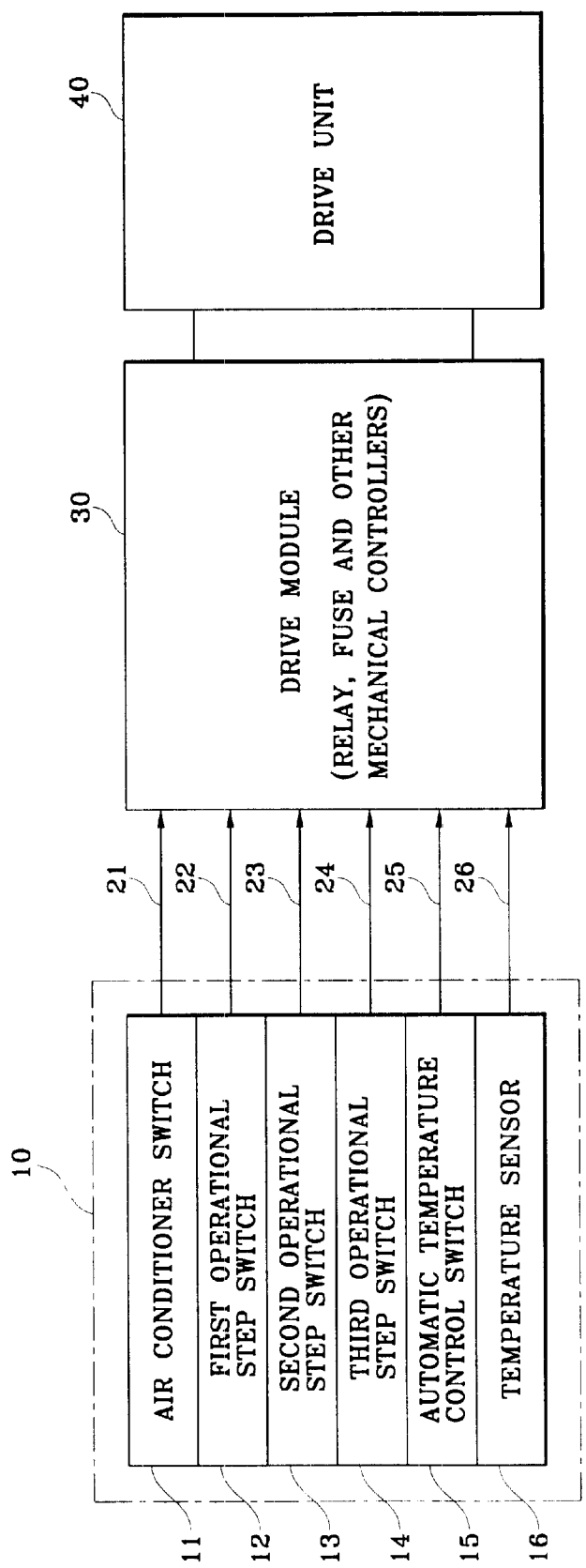
FIG. 3 is a block diagram where remote switch and hard wire are applied to FIG. 1.
Figure 4:
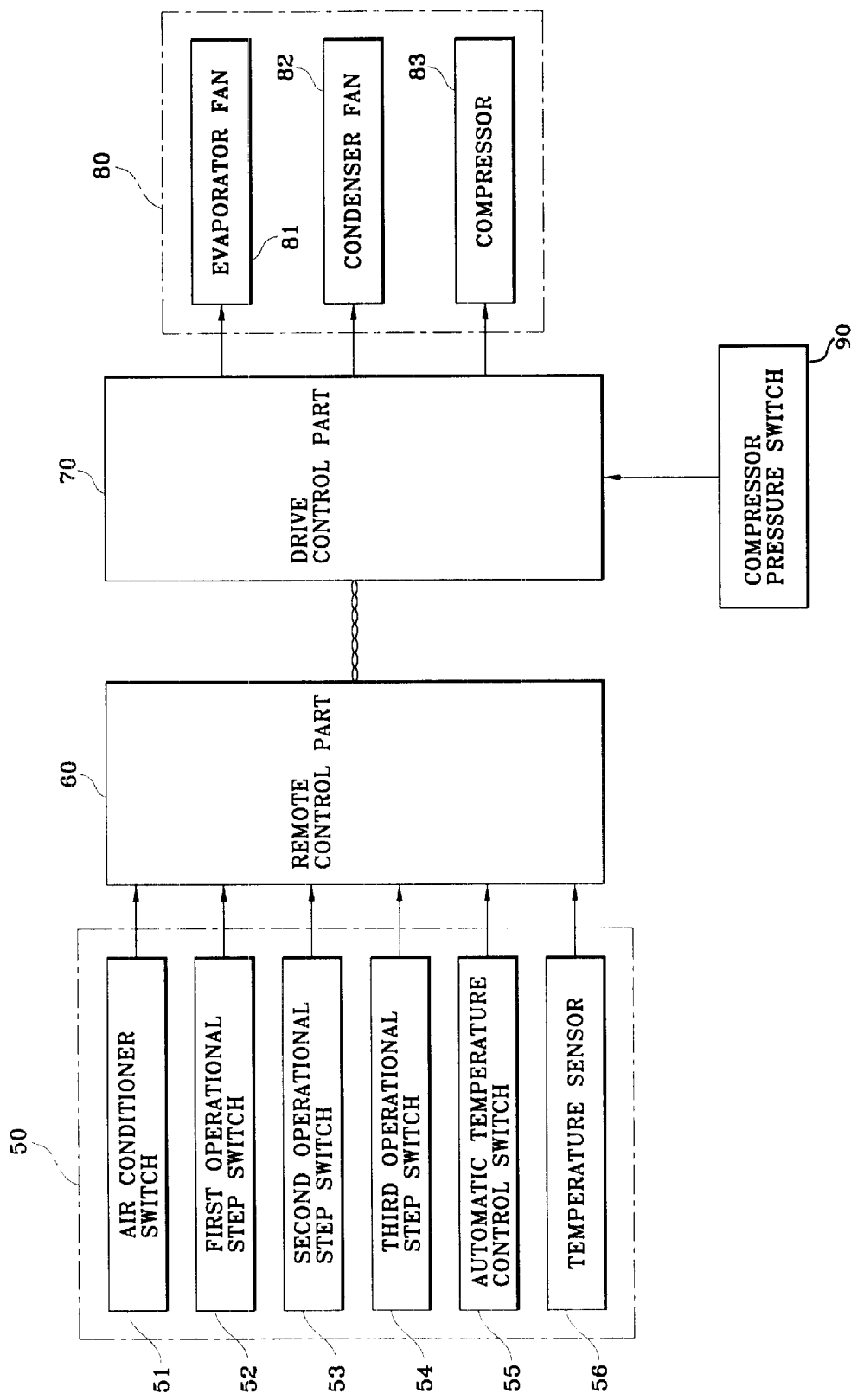
FIG. 4 is a block diagram of an air conditioner control apparatus in accordance with the present invention.
Figure 5A:
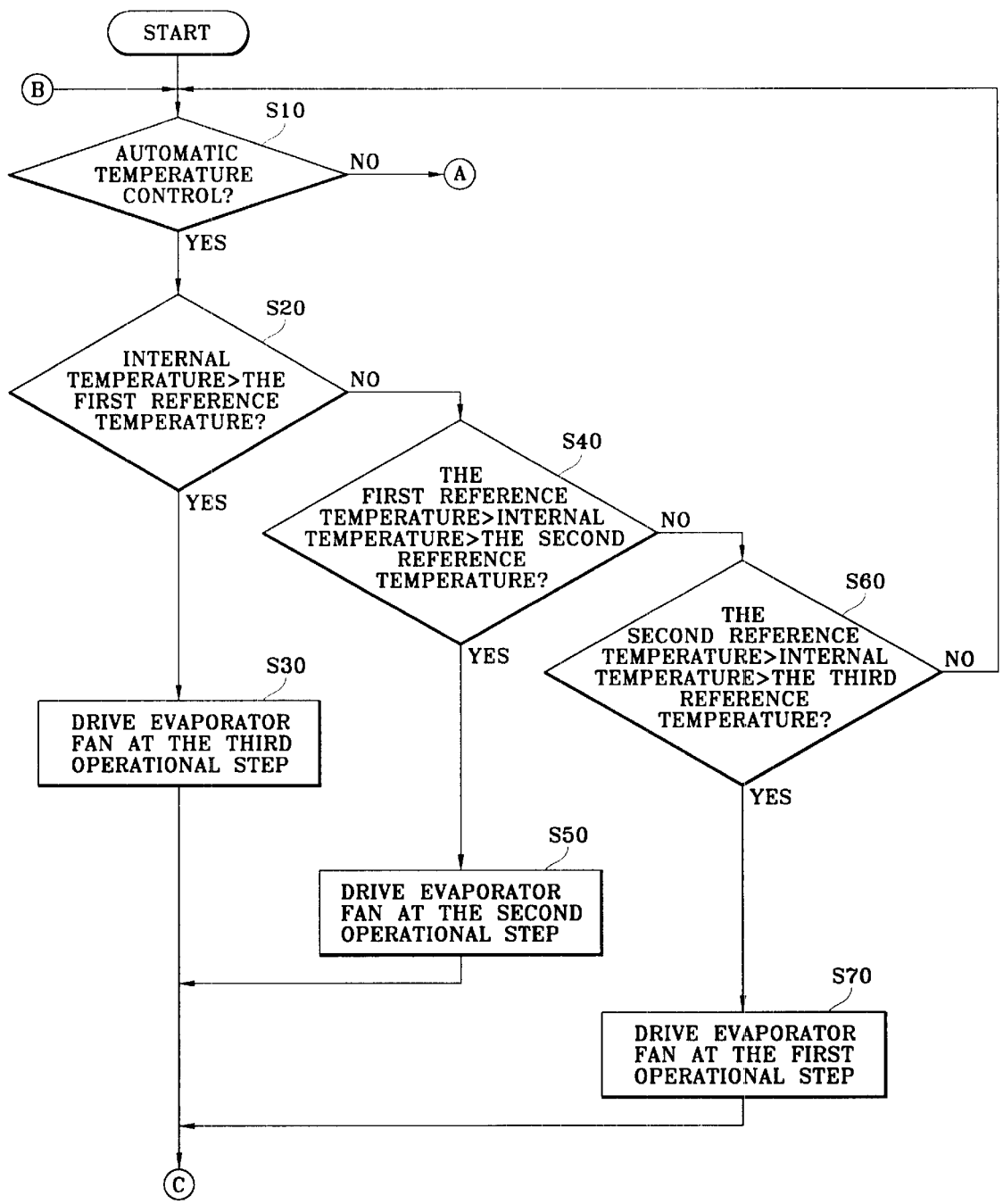
FIGS. 5a and 5b are flow charts illustrating an operational sequence of a method for controlling a vehicular air conditioner in accordance with the present invention.
Figure 5B:
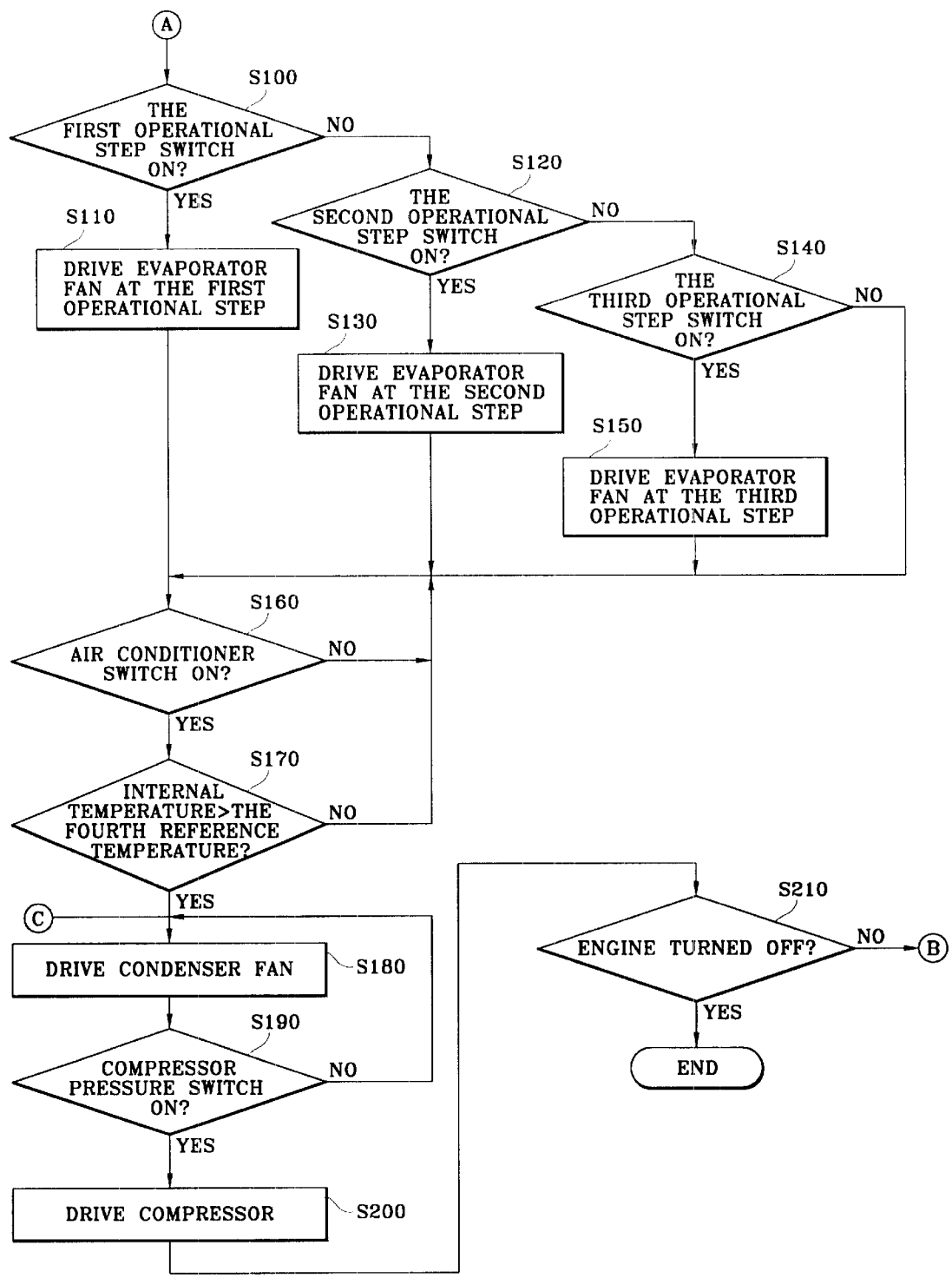

As shown in FIG. 4, a vehicle air conditioner control apparatus of the present invention includes an input part 50, a remote control part 60, a drive control part 70 and a drive part 80. The input part 50 enables the vehicle operator to control operation of the air conditioner. The remote control part 60 transforms the manipulated signals from the input part 50 to a transmission signal and sends same through a communication cable to drive control part 70. The drive control part 70 generates and outputs a signal to drive the air conditioner correspondingly to the transmission signal received from the remote control part 60. The drive part 80 operates according to the drive signal output from the drive control part 70 and performs the function of cooling off the vehicle. Also included is a compressor pressure switch 90 for inputting the pressure status of the compressor 83.

The input part 50 comprises various control switches and sensors. An air conditioner switch 51 generates a relevant electric signal and outputs same to the remote control part 60 if a driver sets the air conditioner to on. A first operational step switch 52 generates and outputs a relevant electric signal to the remote control part 60 if the driver sets the amount of air blown by the air conditioner at a first level. A second operational step switch 53 generates and outputs a relevant electric signal to the remote control part 60 if the driver sets the amount of air blown by the air conditioner at a second level. A third operational step switch 54 generates and outputs a relevant electric signal to the remote control part 60 if the driver sets the amount of air blown by the air conditioner at a third level. An automatic temperature control switch 55 generates and outputs a relevant electric signal to the remote control part 60 if the driver selects an automatic temperature control. Also, a temperature sensor 56 detects the internal temperature of the vehicle and generates and outputs a relevant electric signal to the remote control part 60.

The drive part 80 comprises the operational components of the air conditioner. An air conditioner evaporator 81 evaporates coolant as it operates according to a drive signal output from the drive control part 70. A condenser 82 condenses the coolant as it operates according to a drive signal output from the drive control part 70. A compressor 83 compresses the coolant as it also operates according to a drive signal output from the drive control part 70.

A telecommunication cable is connected between the remote control part 60 and the drive control part 70 for transmission of data. Both remote control part 60 and drive control part 70 may comprise a microprocessor and transceiver, programmed by a person of ordinary skill in the art in accordance with the teachings of the present invention as set forth herein.

Operation of a preferred embodiment of the present invention thus described is as follows:

When a driver presses on the first operational step switch 52 of the input part 10 on the manipulating panel for cooling an internal portion of a vehicle, the remote control part 60 transforms same to a transmission signal and sends it through the telecommunication cable. Then, the drive control part 70 discriminates if the driver turns on the first operational level in response to the input of the signal (S100), and outputs a drive signal to drive the evaporator fan 81 at the first level (S110). The evaporator fan 81 of the drive part 80 is driven at the first operational speed according to the drive signal.

When the driver turns on the air conditioner switch 51, the remote control part 70 transforms same to a transmission signal and sends it through the telecommunication cable. At this time, the drive control part 70 discriminates if the driver turns on the air conditioner switch 51 in response to the transmission signal (S120).

Next, the drive control part 70 interprets the internal temperature detected by the temperature sensor 56 and transmitted through the remote control part 60 and discriminates if the value of the internal temperature is above the preset fourth reference temperature (S170).

If the internal temperature is over the fourth reference temperature, the drive control part 70 outputs a drive signal for driving the condenser fan and then drives the condenser fan 82.

Then, the drive control part 70 interprets the status of the compressor pressure switch 90 and outputs a signal to drive the compressor 83 of the drive part 80 if the value of the pressure falls in status ON (S190). The compressor 83 is driven to cool off the internal portion of the vehicle.

On the other hand, if a driver presses on the second operational step switch 53 at the input part 10 of the driver's manipulating panel to cool off an internal temperature of a vehicle more quickly (S120), the remote control part 60 transforms a relevant signal to a transmission signal and outputs same through the telecommunication cable. The drive control part 70 outputs a drive signal to drive the evaporator fan 81 at the second operational level in response to an input of the signal. As a result, the evaporator fan 81 of the drive part 80 is driven at the second operational speed (S130).

Then, if the driver turns on the air conditioner switch 51 (S160), the condenser 82 and compressor 83 are driven according to the status of the temperature sensor 56 and compressor pressure switch 90.

If a driver presses on the third operational step switch 54 at the input part 10 of the driver's manipulating panel to cool off an internal temperature of a vehicle more quickly (S140), the remote control part 60 transforms a relevant signal to a transmission signal and outputs same through the telecommunication cable. The drive control part 70 outputs a drive signal to drive the evaporator fan 81 at the third operational level in response to an input of the signal. As a result, the evaporator fan 81 of the drive part 80 is driven at the third operational speed (S150).

Then, the drive control part 70 interprets the status of the air conditioner switch 51. If the value falls in status ON (S160), it drives the condenser 82 and compressor 83 according to the status of the temperature sensor 56 and compressor pressure switch 90 as described above.

On the other hand, if the driver presses on the automatic temperature control switch 55 to control temperature automatically, the remote control part 60 transforms a relevant signal to a transmission signal and sends same through the telecommunication cable to the drive control part 70. Then, the drive control part 70 operates according to the transmission signal to interpret the signal detected and sent by temperature sensor 56 and to discriminate if the value of temperature surpasses the preset first reference temperature (S20).

If the internal temperature is higher than the first reference temperature, the drive control part 70 outputs a signal to drive the evaporator fan at the third speed to perform the maximum level of the cooling function (S30). As a result, the evaporator fan 81 of the drive part 80 is driven at the third operational level according to the drive signal output from the drive control part 70.

Then, the drive control part 70 drives a condenser fan (S180) and interprets the status of the compressor pressure switch 90 (S190). If the value falls on status ON, the drive control part 70 controls to drive the compressor 83 (S200).

If the internal temperature is under the first reference temperature at step S20, the drive control part 70 discriminates if the internal temperature is over the preset second reference temperature (S40). If so, the drive control part 70 controls to drive the evaporator fan 81 at the second operational step (S50).

Furthermore, the drive control part 70 drives a condenser fan (SI 80) and interprets the status of the compressor pressure switch 90 (S190). If the value falls on status ON, the drive control part 70 controls to drive the compressor 83 (S200).

If the internal temperature is under the second reference temperature at step S40, the drive control part 70 discriminates whether the internal temperature is greater than the third reference temperature (S60).

If the internal temperature is higher than the third reference temperature at step S60, the drive control part 70 controls to drive the evaporator fan 81 at the first operational step (S70) and the condenser fan (S180) and interprets the status of the compressor pressure switch 90 (S190). If the value falls on status ON, the drive control part 70 controls to drive the compressor 83 (S200).

On the other hand, if the internal temperature is less than the third reference temperature, the drive control part 70 determines that it is not necessary to cool off the internal portion of the vehicle any more. Then, the flow returns to step S10 where the status of all switches are discriminated.

As described above, the vehicle air conditioner can be controlled according to a relevant command on whether the driver selects an automatic or any other step of manual air conditioning operations. In case of the automatic control of air conditioning temperature, the cooling function can be executed adequately to the driver's control of temperature to thereby enable to perform the air conditioning operations more precisely than in the prior art.

Therefore, there are advantages in the present invention in that the vehicle air conditioner control apparatus includes the telecommunication cable connecting from the driver's panel through all the parts of the air conditioner, thereby simplifying the wiring system and reducing the total weight of the air conditioning system. Other advantages include the fact that the conventional hard wiring system is replaced by the telecommunication cable to thereby cut down the manufacturing cost. Therefore, the present invention is also advantageous in reducing the total weight of the vehicle and fuel consumption.

What is claimed is:

1. A method for driving the vehicle air conditioner control apparatus, the method comprising the steps of:

driving an evaporator fan at a predetermined speed according to a degree of the internal temperature of the vehicle if an automatic temperature control signal is selected and remotely sent by a driver;

driving a condenser fan and a compressor according to the status of a pressure switch of a compressor;

driving an evaporator fan at a corresponding to a first, a second, or a third level manually selected and sent remotely; and driving the condenser fan and the compressor according to the status of internal temperature and compressor pressure switch if the remotely sent air conditioner driving signal is received after the evaporator fan is driven.

2. The method, as defined in claim 1, wherein, if the driver remotely selects and sends an automatic temperature control signal, there is further comprised a method for driving the evaporator fan at a predetermined speed according to an internal temperature, the method comprising the steps of:

driving an evaporator fan at a third speed if the internal temperature is over the preset first reference temperature;

driving an evaporator fan at a second speed if the internal temperature is less than the preset first reference temperature but greater than the second reference temperature; and driving an evaporator fan at a first speed if the internal temperature is less than the preset second reference temperature but greater than the third reference temperature.

* * * * *